United States Patent
Hirohashi

(10) Patent No.: US 11,930,137 B2
(45) Date of Patent: Mar. 12, 2024

(54) IMAGE READING APPARATUS TO SET INFORMATION PROCESSING APPARATUS CAPABLE OF EXECUTING IMAGING CONTROL

(71) Applicant: PFU LIMITED, Kahoku (JP)

(72) Inventor: Koji Hirohashi, Ishikawa (JP)

(73) Assignee: PFU LIMITED, Kahoku (JP)

( * ) Notice: Subject to any disclaimer, the term of this patent is extended or adjusted under 35 U.S.C. 154(b) by 0 days.

(21) Appl. No.: 17/940,686

(22) Filed: Sep. 8, 2022

(65) Prior Publication Data
US 2023/0114500 A1     Apr. 13, 2023

(30) Foreign Application Priority Data
Oct. 13, 2021 (JP) ................. 2021-168392

(51) Int. Cl.
G06K 15/00     (2006.01)
H04N 1/00     (2006.01)

(52) U.S. Cl.
CPC ..... *H04N 1/00204* (2013.01); *H04N 1/00689* (2013.01); *H04N 1/00694* (2013.01); *H04N 1/00811* (2013.01); *H04N 1/00952* (2013.01); *H04N 1/00973* (2013.01); *H04N 2201/0075* (2013.01)

(58) Field of Classification Search
CPC ........... H04N 1/00204; H04N 1/00689; H04N 1/00694; H04N 1/00811; H04N 1/00952; H04N 1/00973; H04N 2201/0075
See application file for complete search history.

(56) References Cited

U.S. PATENT DOCUMENTS

| 2008/0163242 A1 | 7/2008 | Furuichi et al. | |
| 2010/0077089 A1* | 3/2010 | Konishi | H04N 1/32502 709/228 |
| 2015/0002890 A1* | 1/2015 | Okuno | G06F 3/1205 358/1.15 |

(Continued)

FOREIGN PATENT DOCUMENTS

| JP | H09-036999 A | 2/1997 |
| JP | 2005-051297 A | 2/2005 |

(Continued)

*Primary Examiner* — Moustapha Diaby
(74) *Attorney, Agent, or Firm* — LEWIS ROCA ROTHGERBER CHRISTIE LLP

(57) ABSTRACT

An information processing apparatus includes an imaging device to image a medium, a communication device provided so as to communicate with a plurality of information processing apparatuses, and a processor to acquire a use state of the image reading apparatus, set an information processing apparatus capable of executing imaging control of the imaging device, and control the imaging device according to an instruction signal from the set information processing apparatus. The processor determines whether to set a second information processing apparatus as the information processing apparatus capable of executing the imaging control, based on the use state, when receiving a request signal of the imaging control from the second information processing apparatus in a state where a first information processing apparatus is set as the information processing apparatus capable of executing the imaging control.

18 Claims, 9 Drawing Sheets

(56) References Cited

U.S. PATENT DOCUMENTS

2016/0173707 A1* 6/2016 Ikeda ................ H04N 1/00244
358/468

FOREIGN PATENT DOCUMENTS

| JP | 2008-096307 A | | 4/2008 | | |
|----|---------------|---|--------|---|---|
| JP | 2008-165325 A | | 7/2008 | | |
| JP | 2016115969 A | * | 6/2016 | ......... | H04N 1/00236 |

* cited by examiner

IMAGE READING APPARATUS TO SET INFORMATION PROCESSING APPARATUS CAPABLE OF EXECUTING IMAGING CONTROL

CROSS-REFERENCE TO RELATED APPLICATIONS

This application is based upon and claims the benefit of priority of prior Japanese Patent Application No. 2021-168392, filed on Oct. 13, 2021, the entire contents of which are incorporated herein by reference.

TECHNICAL FIELD

Embodiments discussed in the present specification relate to setting an information processing apparatus capable of executing imaging control.

BACKGROUND

Conventionally, an image reading apparatus such as a scanner to image a medium is utilized in various scenes. In particular, in recent years, an image reading apparatus capable of communicating with a plurality of information processing apparatuses has been developed so that the imaging control can be executed from the plurality of information processing apparatuses. In such an image reading apparatus, it is necessary that the information processing apparatus capable of executing the imaging control is appropriately managed so that the imaging control is not executed from the plurality of information processing apparatuses in duplicate.

A scanner/printer server system in which a client can directly access a scanner/printer server to interrupt a scanner input without using a spool function in a file server, is disclosed (refer to Japanese Unexamined Patent Publication No. H9-36999). At this time, the scanner/printer server system compares the priority level of the client side. When the priority is higher than that of the job being executed by the file server, it interrupts the execution of the job and executes the image input by the scanner.

A network scanning system in which a network scanner and a plurality of computers on which a network scanner driver for the network scanner is installed are connected to a network, is disclosed (refer to Japanese Unexamined Patent Publication No. 2005-51297). The network scanner performs a reservation reception process for storing computer identification information of the computer that transmitted a usage request information when the usage request information is received in a situation in which a control process in which it is operated so as to be used from one computer is executed.

SUMMARY

According to some embodiments, an information processing apparatus includes an imaging device to image a medium, a communication device provided so as to communicate with a plurality of information processing apparatuses, and a processor to acquire a use state of the image reading apparatus, set an information processing apparatus capable of executing imaging control of the imaging device, and control the imaging device according to an instruction signal from the set information processing apparatus. The processor determines whether to set a second information processing apparatus as the information processing apparatus capable of executing the imaging control, based on the use state, when receiving a request signal of the imaging control from the second information processing apparatus in a state where a first information processing apparatus is set as the information processing apparatus capable of executing the imaging control.

According to some embodiments, a method for controlling an image reading apparatus including a communication device provided so as to communicate with a plurality of information processing apparatuses, includes imaging a medium, by an imaging device, acquiring a use state of the image reading apparatus, setting an information processing apparatus capable of executing imaging control of the imaging device, and controlling the imaging device according to an instruction signal from the set information processing apparatus. Whether to set a second information processing apparatus as the information processing apparatus capable of executing the imaging control, is determined based on the use state, when receiving a request signal of the imaging control from the second information processing apparatus in a state where a first information processing apparatus is set as the information processing apparatus capable of executing the imaging control.

According to some embodiments, a computer-readable, non-transitory medium storing a computer program causes an image reading apparatus including an imaging device to image a medium, and a communication device provided so as to communicate with a plurality of information processing apparatuses, to execute a process. The process includes imaging a medium, by an imaging device, acquiring a use state of the image reading apparatus, setting an information processing apparatus capable of executing imaging control of the imaging device, and controlling the imaging device according to an instruction signal from the set information processing apparatus. Whether to set a second information processing apparatus as the information processing apparatus capable of executing the imaging control, is determined based on the use state, when receiving a request signal of the imaging control from the second information processing apparatus in a state where a first information processing apparatus is set as the information processing apparatus capable of executing the imaging control.

DESCRIPTION OF EMBODIMENTS

It is to be understood that both the foregoing general description and the following detailed description are exemplary and explanatory, and are not restrictive of the invention, as claimed.

Hereinafter, an information processing apparatus, a method for controlling an image reading apparatus, and a computer-readable, non-transitory medium storing a computer program according to an embodiment, will be described with reference to the drawings. However, it should be noted that the technical scope of the invention is not limited to these embodiments, and extends to the inventions described in the claims and their equivalents.

Figure 1:
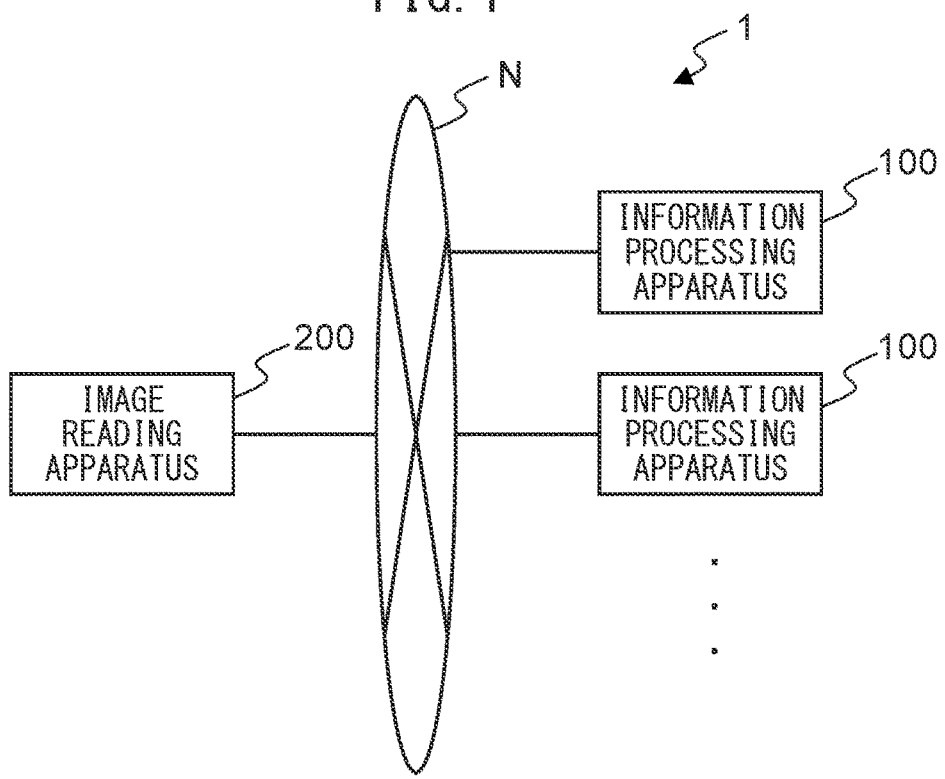
FIG. 1 is a configuration diagram of an example of an image processing system 1 according to the embodiment.

FIG. 1 is a configuration diagram of an example of an image processing system 1 according to the embodiment.

The image processing system 1 includes a plurality of information processing apparatuses 100 and an image reading apparatus 200. The information processing apparatus 100 and the image reading apparatus 200 communicate with each other via a network N. The information processing apparatus 100 is a personal computer, a notebook-type personal computer, a tablet-type computer, a smartphone, etc. The information processing apparatus 100 may be a server, etc., provided in a cloud network. The image reading apparatus 200 is an image scanner, etc., to convey and image a medium being a document. The media may be paper, thin paper, cardboard, card, etc. The image reading apparatus 200 may be a facsimile, a copying machine, a printer multifunction machine (MFP, Multifunction Peripheral), etc. The image reading apparatus 200 may be a flatbed type image scanner, facsimile, copying machine, MFP, etc., to image a medium without conveying. The image reading apparatus 200 may be a mobile phone, a smartphone, a tablet-type computer, a notebook-type personal computer, etc., to image a person, an object or a landscape, etc. The Network N is internet, intranet, etc.

Figure 2:
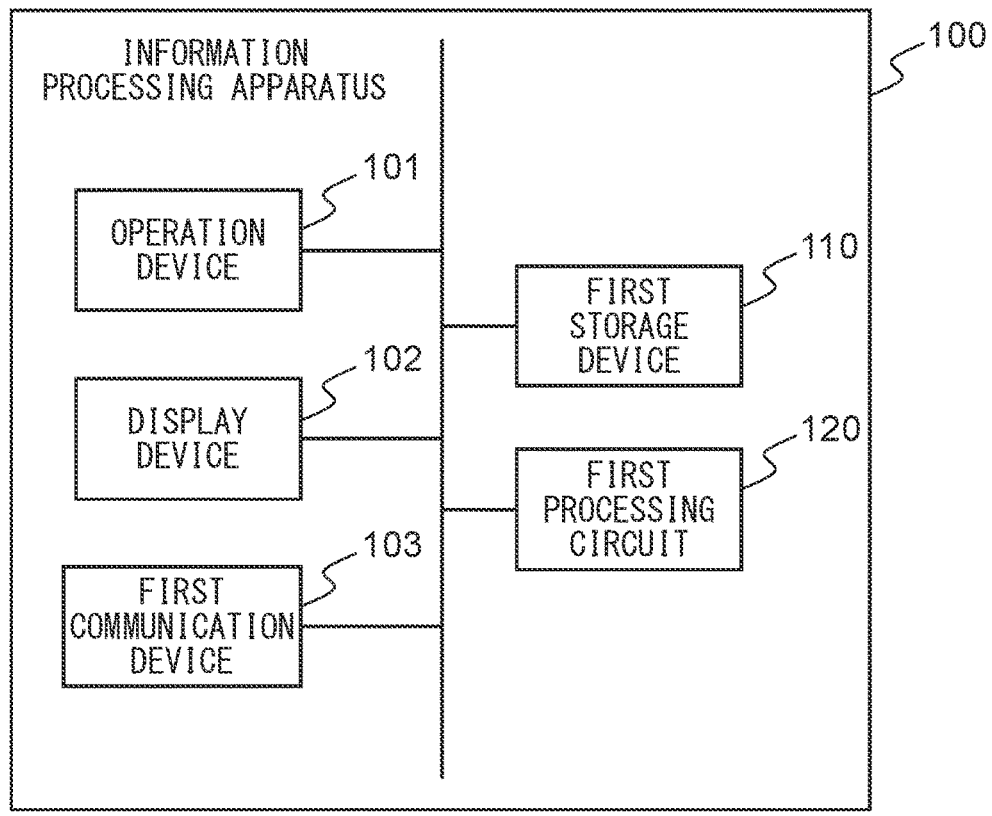
FIG. 2 is a block diagram illustrating a schematic configuration of an information processing apparatus 100.

FIG. 2 is a block diagram illustrating a schematic configuration of an information processing apparatus 100.

The information processing apparatus 100 includes an operation device 101, a display device 102, a first communication device 103, a first storage device 110, a first processing circuit 120, etc.

The operation device 101 includes an input device and an interface circuit for acquiring a signal from the input device, receives an operation by a user, and outputs a signal corresponding to the input by the user to the first processing circuit 120.

The display device 102 includes a display constituted of a liquid crystal, an organic electro-luminescence (EL), etc., and an interface circuit for outputting image data to the display, to display image data on the display in accordance with an instruction from the first processing circuit 120. A display device and an operation device may be integrally provided using a touch panel type input device.

The first communication device 103 includes a wired communication interface circuit according to a communication protocol such as TCP/IP (Transmission Control Protocol/Internet Protocol). The first communication device 103 is communicative with the image reading apparatus 200, and communicates with the image reading apparatus 200 to transmit and receive various types of images and information. The first communication device 103 may include an antenna for transmitting and receiving a wireless signal and a wireless communication interface circuit for transmitting and receiving signals through a wireless communication line in accordance with a predetermined wireless communication protocol, and communicate with the image reading apparatus 200. The predetermined wireless communication protocol is, for example, a wireless LAN (Local Area Network).

The first storage device 110 includes a memory device such as a random access memory (RAM) or a read only memory (ROM), a fixed disk device such as a hard disk, or a portable storage device such as an optical disk. The first storage device 110 stores computer programs, databases, tables, etc., used for various kinds of processing of the information processing apparatus 100. The computer program may be installed on the first storage device 110 from a computer-readable, non-transitory portable recording medium such as a compact disc read only memory (CD-ROM), a digital versatile disc read only memory (DVD-ROM), or the like by using a well-known setup program etc.

The first processing circuit 120 operates according to a program stored in advance in the first storage device 110. The processing circuit 170 is, for example, a CPU (Central Processing Unit). The first processing circuit 120 may be a digital signal processor (DSP), a large scale integration (LSI), an application specific integrated circuit (ASIC), a field-programmable gate array (FPGA), etc.

The first processing circuit 120 is connected to the operation device 101, the display device 102, the first communication device 103 and the first storage device 110, etc., and controls each of these devices. The first processing circuit 120 controls each device to execute the imaging control of the image reading apparatus 200.

Figure 3:
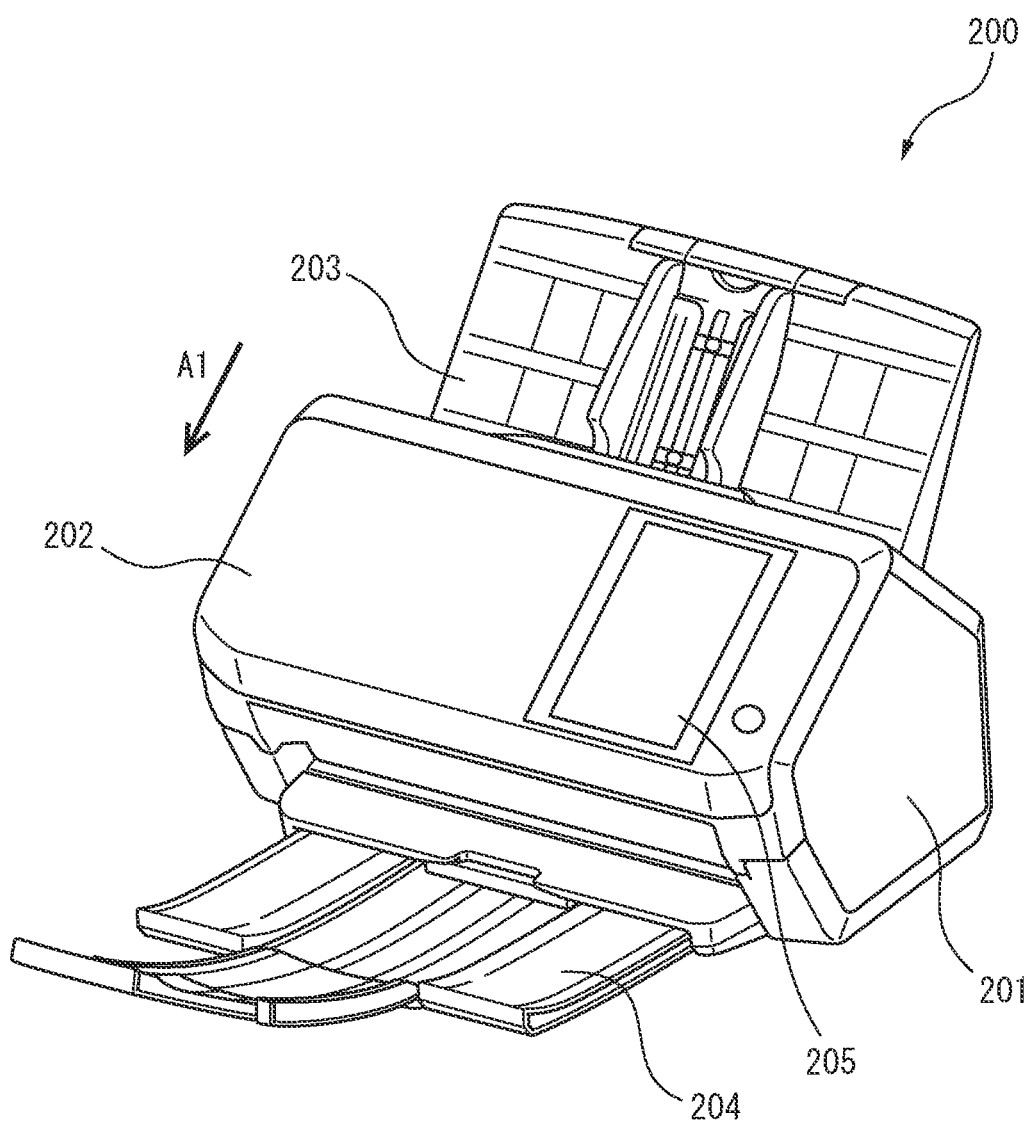
FIG. 3 is a perspective view illustrating an image reading apparatus 200.

FIG. 3 is a perspective view illustrating an image reading apparatus 200 configured as an image scanner.

The image reading apparatus 200 includes a lower housing 201, an upper housing 202, a medium tray 203, an ejection tray 204, a display operation device 205, etc.

The upper housing 202 is located at a position covering the upper surface of the medium conveying device 200 and is engaged with the lower housing 201 by hinges so as to be opened and closed at a time of medium jam, during cleaning the inside of the medium conveying device 200, etc.

The medium tray 203 is engaged with the lower housing 201 in such a way as to be able to place a medium to be conveyed, to place the medium. The ejection tray 204 is engaged with the lower housing 201 in such a way as to be able to hold an ejected medium. The ejection tray 204 may be engaged with the upper housing 202.

The display operation device 205 is an example of an operation device. The display operation device 205 includes a liquid crystal display having a touch panel function, an input interface circuit for acquiring an input signal from the touch panel, and an output interface circuit for outputting image data to the liquid crystal display. The display operation device 205 receives an input operation by the user from the touch panel, outputs an operation signal corresponding to the input operation of the user, and displays the image data on the liquid crystal display. The operation device and the display device may be provided separately. In that case, the operation device includes an input device such as a button, and an interface circuit acquiring a signal from the input device, receives an input operation by a user, and outputs an operation signal based on the input operation by the user. The display device includes a display including a liquid crystal or organic EL, and an interface circuit outputting image data to the display, and displays the image data on the display.

In FIG. 3, an arrow A1 indicates a medium conveying direction. Hereinafter, an upstream refers to an upstream in the medium conveying direction A1, and a downstream refers to a downstream in the medium conveying direction A1.

Figure 4:
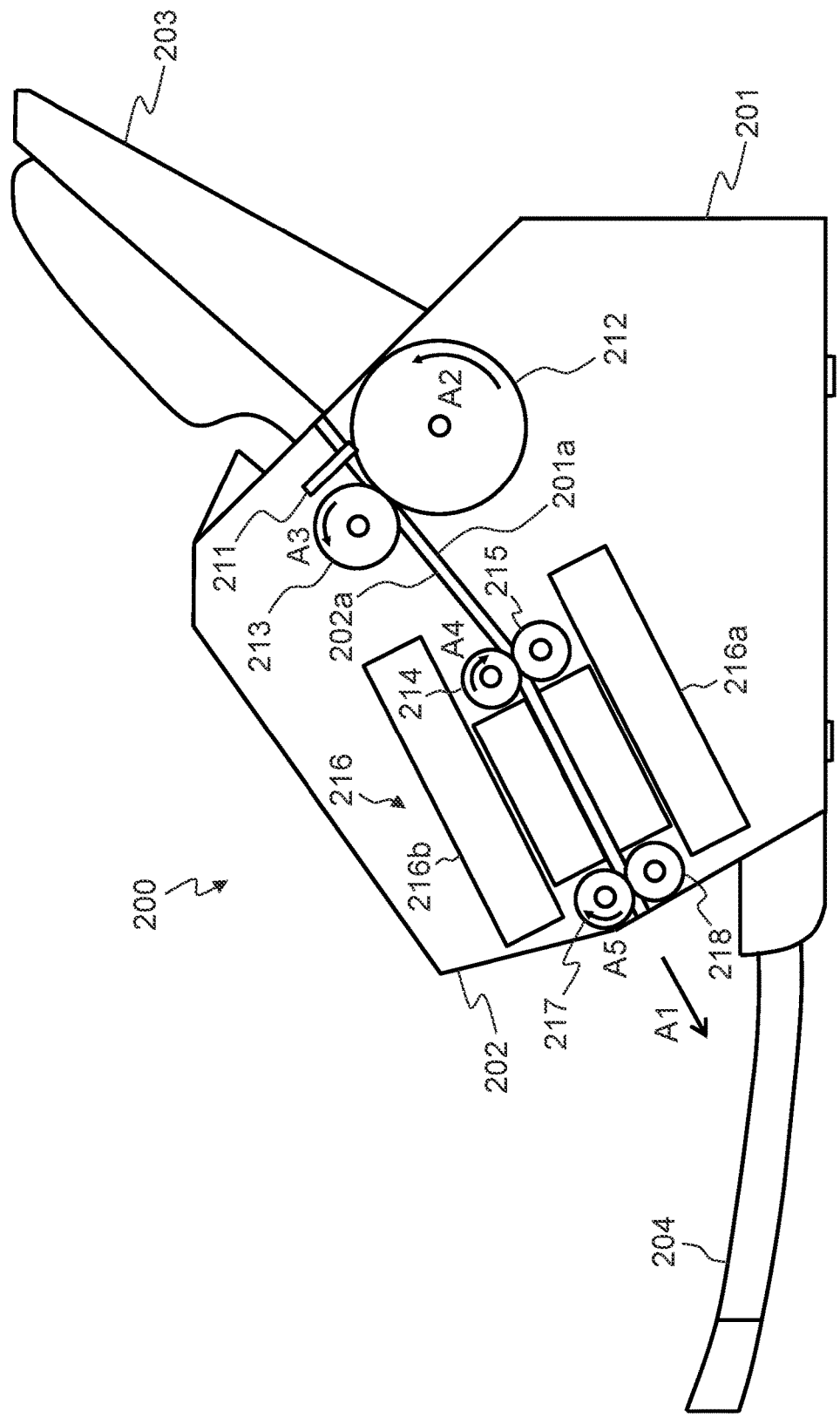
FIG. 4 is a diagram for illustrating a conveyance path inside an image reading apparatus 200.

FIG. 4 is a diagram for illustrating a conveyance path inside an image reading apparatus 200.

The conveyance path inside the image reading apparatus 200 includes a medium sensor 211, a feed roller 212, a separation roller 213, a first conveyance roller 214, a first driven roller 215, an imaging device 216, a second conveyance roller 217, a second driven roller 218, etc.

The number of each of the feed roller 212, the separation roller 213, the first conveyance roller 214, the first driven roller 215, the second conveyance roller 217 and/or the second driven roller 218 is not limited to one, and may be plural. In that case, a plurality of feed rollers 212, the separation roller 213, the first conveyance roller 214, the first driven roller 215, the second conveyance roller 217 and/or the second driven roller 218 are arranged side by side at intervals in a width direction perpendicular to the medium conveying direction A1, respectively.

A surface facing the upper housing 202 of the lower housing 201 forms a lower guide 201a of the conveyance path of the medium, and a surface facing the lower housing 201 of the upper housing 202 forms an upper guide 202a of the conveyance path of the medium.

The medium sensor 211 is located on the upstream side of the feed roller 212 and the separation roller 213. The medium sensor 211 includes a contact detection sensor, and detects whether or not the medium is placed on the medium tray 203. The medium sensor 211 generates and outputs a medium signal whose signal value changes in a state where the medium is placed on the medium tray 203 and a state where it is not placed.

The medium sensor 211 is not limited to the contact detection sensor, any other sensor, such as a light detection sensor, capable of detecting the presence or absence of the medium may be used as the medium sensor 211. When the light detection sensor is used, the medium sensor 211 includes a light emitter and a light receiver provided on one side with respect to the medium conveyance path, and a light guide tube provided at a position facing the light emitter and the light receiver across the medium conveyance path. The light emitter is a light emitting diode (LED), etc., and emits light toward the medium conveyance path. On the other hand, the light receiver receives the light emitted by the light emitter and guided by the light guide. When the medium is present at a position facing the medium sensor 211, the light receiver does not detect the light emitted from the light emitter since the light emitted from the light emitter is shielded by the medium. The light receiver generates and outputs a medium signal of which signal value changes between a state in which a medium exists at a position of the medium sensor 211 and a state in which a medium does not exist at the position, based on an intensity of the received light. Instead of the light guide, a reflecting member may be used. Further, the light emitter and the light receiver may be provided to face each other across the medium conveyance path.

The feed roller 212 is provided on the lower housing 201, and sequentially separate and feed media placed on the medium tray 203 from the lower side. The separation roller 213 is a so-called brake roller or retard roller, is provided on the upper housing 202, and is located to face the feed roller 212, to rotate in the opposite direction of the medium feeding direction.

The first conveyance roller 214 and the first driven roller 215 are provided on the upstream side of the feed roller 212 and the separation roller 213, and the downstream side of the imaging device 216. The first conveyance roller 214 and the first driven roller 215 are provided to face each other in the upper housing 202 and the lower housing 201, respectively, to convey the medium fed by the feed roller 212 and the separation roller 213 to the imaging device 216.

The imaging device 216 is an example of an imaging device. The imaging device 216 includes a first imaging device 216a and a second imaging device 216b located to face each other across the medium conveyance path. The first imaging device 216a includes a reduction optical system type line sensor including an imaging element based on charge coupled devices (CCDs) linearly located Further, the first imaging device 216a includes a lens for forming an image on the imaging element, and an A/D converter for amplifying and analog-digital (A/D) converting an electric signal output from the imaging element. The first imaging device 216a generates and outputs an input image by imaging a front side of a conveyed medium.

Similarly, the second imaging device 216b includes a reduction optical system type line sensor including an imaging element based on CCDs linearly located. Further, the second imaging device 216b includes a lens for forming an image on the image element, and an A/D converter for amplifying and analog-digital (A/D) converting an electric signal output from the imaging element. The second imaging device 216b generates and outputs an input image by imaging a back side of a conveyed medium.

Only either of the first imaging device 216a and the second imaging device 216b may be located in the image reading apparatus 200 and only one side of a medium may be read. A reduction optical system type line sensor including an imaging element based on by Complementary Metal Oxide Semiconductor (CMOS) may be utilized, in place of the reduction optical system type line sensor including an imaging element based on CCDs. A line sensor of a contact image sensor (CIS) of an unmagnification optical system type including an imaging element based on CCDs or CMOS may be utilized.

The second conveyance roller 217 and the second driven roller 218 are provided on the downstream side of the imaging device 216. The second conveyance roller 217 and the second driven roller 218 are provided to face each other in the upper housing 202 and the lower housing 201, respectively, to eject the medium imaged by the imaging device 216 to the ejection tray 104.

A medium placed on the medium tray 203 is conveyed between the lower guide 201a and the upper guide 202a in the medium conveying direction A1, by the feed roller 212 rotating in a direction of an arrow A2 in FIG. 4. The separation roller 213 rotates in a direction of an arrow A3, that is, in a direction opposite to the medium feeding direction, when the medium is fed. By the workings of the feed roller 212 and the separation roller 213, when a plurality of media are placed on the medium tray 203, only the medium in contact with the feed roller 212, out of the media placed on the medium tray 203, is separated. Consequently, conveyance of a medium other than the separated medium is restricted (prevention of multi-feed)

The medium is fed between the first conveyance roller 214 and the first driven roller 215 while being guided by the lower guide 201a and the upper guide 202b. The medium is fed between the first imaging device 216a and the second imaging device 216b by the first conveyance roller 214 rotating in a direction of an arrow A4. The media read by the imaging device 216 is ejected on the ejection tray 204 by the second conveyance roller 217 rotating in a direction of an arrow A5.

Figure 5:
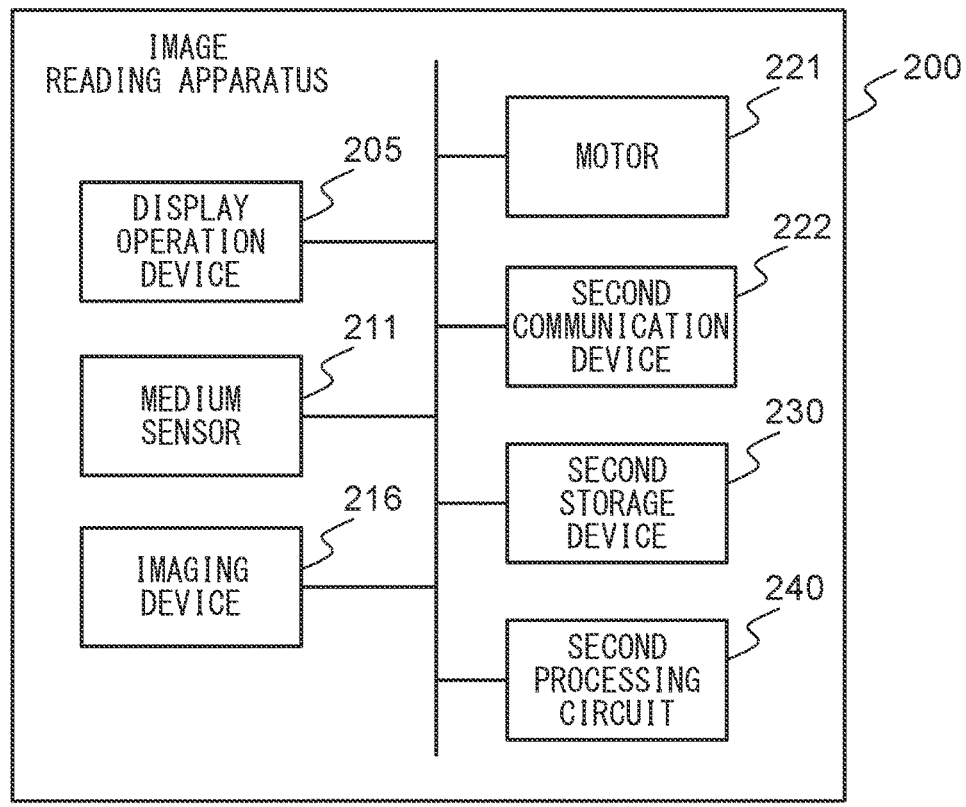
FIG. 5 is a block diagram illustrating a schematic configuration of the image reading apparatus 200.

FIG. 5 is a block diagram illustrating a schematic configuration of the image reading apparatus 200.

The image reading apparatus 200 further includes a motor 221, a second communication device 222, a second storage device 230, a second processing circuit 240, etc., in addition to the configuration described above.

The motor 221 includes one or more motors and rotates the feed roller 212, the separation roller 213, the first conveyance roller 214 and the second conveyance roller 217 by a control signal from the second processing circuit 240 to convey the medium. The first driven roller 215 and/or the second driven roller 218 may be provided to rotate by a driving force from the motor, rather than to be driven to rotate according to the rotation of the first conveyance roller 214 and the second conveyance roller 217.

The second communication device 222 is an example of a communication device. The second communication device 222 includes a wired communication interface circuit according to a communication protocol such as TCP/IP. The second communication device 222 is provided so as to communicate with a plurality of information processing apparatuses 100, communicates with the plurality of information processing apparatuses 100, and transmits and receives various images and information. The second communication device 222 may include an antenna for transmitting and receiving a wireless signal and a wireless communication interface circuit for transmitting and receiving signals through a wireless communication line in accordance with a predetermined wireless communication protocol, and communicate with the information processing apparatus 100. The predetermined wireless communication protocol is, for example, a wireless LAN The second storage device 230 includes a memory device such as a RAM or a ROM, a fixed disk device such as a hard disk, or a portable storage device such as a flexible disk or an optical disk. The second storage device 230 stores computer programs, databases, tables, etc., used for various kinds of processing of the image reading apparatus 200. The computer program may be installed on the second storage device 230 from a computer-readable, non-transitory portable recording medium such as a compact disc read only memory (CD-ROM), a digital versatile disc read only memory (DVD-ROM), or the like by using a well-known setup program etc.

The second processing circuit 240 operates according to a program stored in advance in the second storage device 230. The second processing circuit 240 is, for example, a CPU. The second processing circuit 240 may be a DSP, an LSI, an ASIC, a FPGA, etc.

The second processing circuit 240 is connected to the display operation device 205, the medium sensor 211, the imaging device 216, the motor 221, the second communication device 222 and the second storage device 230, etc., and controls these respective portions. The second processing circuit 240 performs the input-output control of the display operation device 205, the communication control of the second communication device 222 and the control of the second storage device 230. Further, the second processing circuit 240 performs the drive control of the motor 221 and the imaging control of the imaging device 216, etc., in accordance with an instruction signal received from the information processing apparatus 100 via the second communication device 222, acquires the input image, and transmits it to the information processing apparatus 100 via the second communication device 222.

Figure 6:
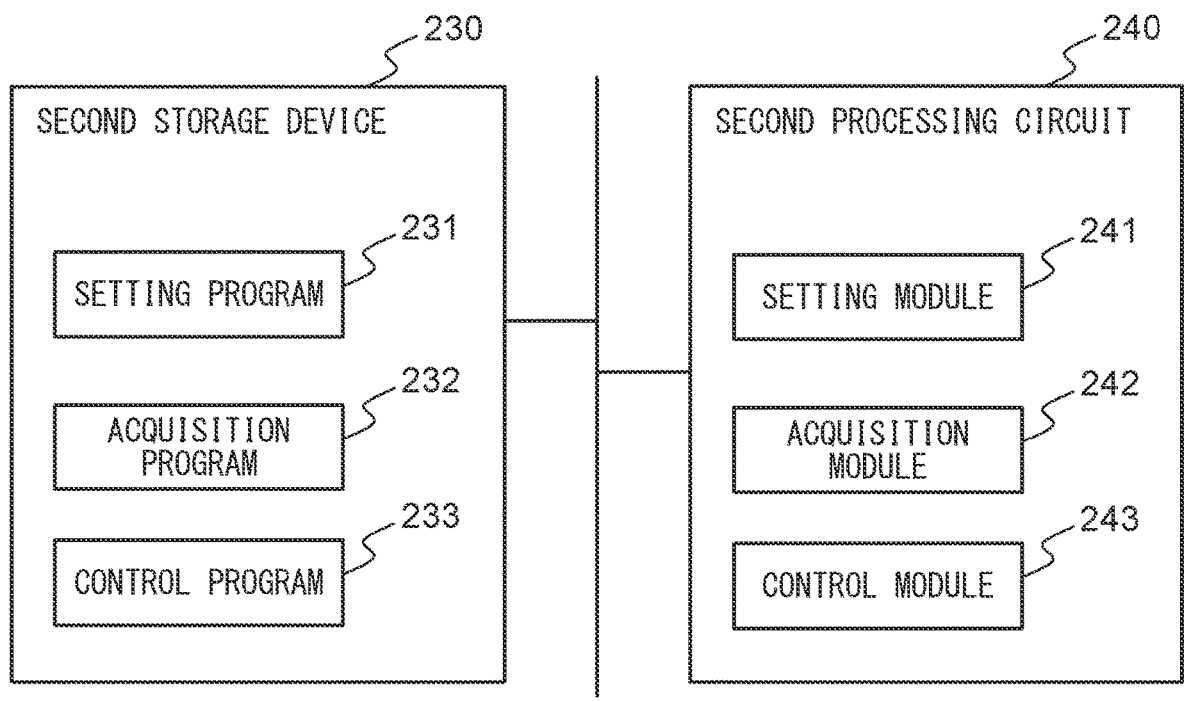
FIG. 6 is a diagram illustrating a schematic configuration of a second storage device 230 and a second processing circuit 240.

FIG. 6 is a diagram illustrating a schematic configuration of a second storage device 230 and a second processing circuit 240.

As shown in FIG. 6, each program such as a setting program 231, an acquisition program 232, and a control program 233, is stored in the second storage device 230. Each of these programs is a functional module implemented by software operating on a processor. The second processing circuit 240 reads each program stored in the second storage device 230, and operates according to each of the read programs. Thus, the second processing circuit 240 functions as a setting module 241, an acquisition module 242, and a control module 243.

Figure 7:
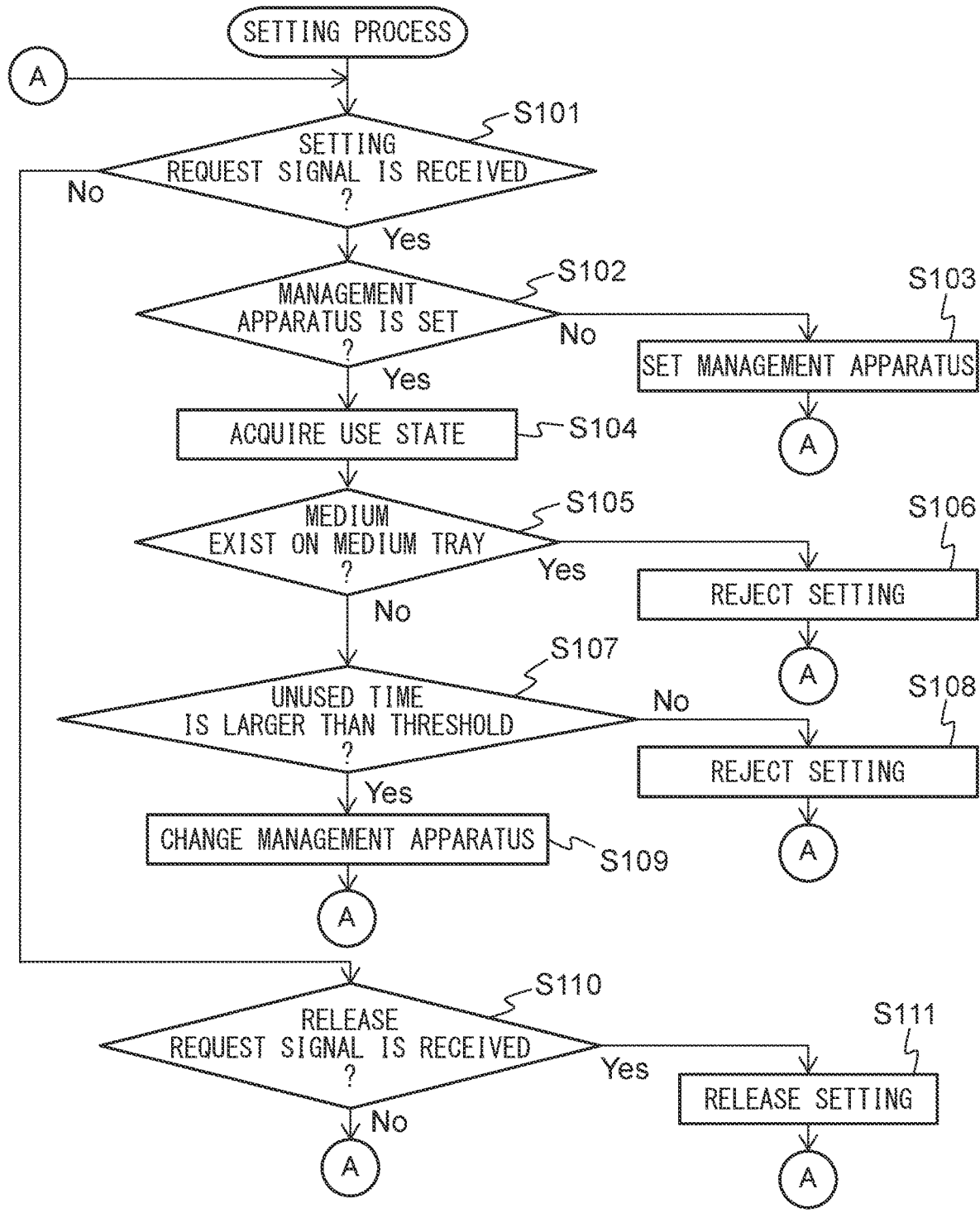
FIG. 7 is an operation sequence illustrating an operation example of a setting process.

FIG. 7 is an operation sequence illustrating an operation example of a setting process performed by the image reading apparatus 200.

Hereinafter, an example of the operation of the setting processing of the image reading apparatus 200 will be described with referring to a flowchart illustrated in FIG. 7. The operation flow described below is executed mainly by the second processing circuit 240 in cooperation with each element in the image reading apparatus 200, in accordance with a program previously stored in the second storage device 230.

First, the setting module 241 determines whether or not it has received a setting request signal from any of the information processing apparatuses 100 via the second communication device 222 (step S101). The setting request signal is an example of a request signal for the imaging control of the imaging device 216, and a signal for requesting to set each information processing apparatus 100 as an information processing apparatus capable of executing the imaging control of the imaging device 216. The first processing circuit 120 of the information processing apparatus 100 transmits the setting request signal to the image reading apparatus 200 via the first communication device 103 when an instruction of the imaging control of the imaging device 216 of the image reading apparatus 200 is input by the user using the operation device 101. For example, the first processing circuit 120 transmits the setting request signal when an application software for controlling the image reading apparatus 200 is started. Hereinafter, the information processing apparatus capable of executing the imaging control of the imaging device 216 may be referred to as a management apparatus. When not receiving the setting request signal, the setting module 241 proceeds the process to step S110.

On the other hand, when receiving the setting request signal, the setting module 241 determines whether or not a specific information processing apparatus 100 has already been set as the management apparatus (step S102).

When any of the information processing apparatuses 100 has not yet been set as the management apparatus, the setting module 241 sets the information processing apparatus 100 which is the transmission source of the setting request signal as the management apparatus (step S103), and returns the process to step S101. Thereafter, the imaging control of the image reading apparatus 200 is occupied by the information processing apparatus 100 set as the management apparatus, and the imaging control of the image reading apparatus 200 by the other information processing apparatus 100 is prohibited. The setting module 241 transmits a setting notification signal to the information processing apparatus 100 which is the transmission source of the setting request signal via the second communication device 222. The setting notification signal is a signal for notifying that the information processing apparatus 100 has been set as the management apparatus of the image reading apparatus 200. When receiving the setting notification signal, the information processing apparatus 100 displays on the display device 102 that it has been set as the management apparatus of the image reading apparatus 200, to notify the user of it.

Thus, the setting module 241 sets the management apparatus based on a logical element, that is, whether or not any one of the information processing apparatus 100 has already been set as the management apparatus. Thus, the setting module 241 can appropriately change the management apparatus.

On the other hand, when a specific information processing apparatus 100 has already been set as the management apparatus, the acquisition module 242 acquires an use state of the image reading apparatus 200 (step S104). The acquisition module 242 acquires, for example, whether or not the medium is placed on the medium tray 203, as the use state. In that case, the acquisition module 242 acquires the medium signal from the medium sensor 211, and determines whether or not the medium is placed on the medium tray 203 based on a signal value of the acquired medium signal.

Further, the acquisition module 242 may acquire an unused time in which the medium is not placed on the medium tray 203 while the specific information processing apparatus 100 is set as the management apparatus by the setting module 241, as the use state. In that case, the acquisition module 242 stores the time at which the specific information processing apparatus 100 is set as the management apparatus by the setting module 241 in the second storage device 230. The acquisition module 242 periodically acquires the medium signal from the medium sensor 211, and calculates a time in which the state where the medium is not placed on the medium tray 203 is continued from a time at which a specific information processing apparatus 100 is set as the management apparatus, as the unused time. Further, when the medium is placed on the medium tray 203 after the specific information processing apparatus 100 is set as the management apparatus, thereafter, the acquisition module 242 calculates a time in which the state where the medium is not placed on the medium tray 203 is continued, as the unused time.

Next, the setting module 241 determines whether or not the medium is placed on the medium tray 203, based on the use state acquired by the acquisition module 242 (step S105).

When the medium is placed on the medium tray 203, the setting module 241 rejects setting the information processing apparatus 100 which is the transmission source of the setting request signal as the management apparatus (step S106), and returns the process to step S101. The setting module 241 transmits a setting reject signal to the information processing apparatus 100 which is the transmission source of the setting request signal via the second communication device 222. The setting reject signal is a signal for notifying that setting the information processing apparatus 100 as the management apparatus is rejected. When receiving the setting reject signal, the information processing apparatus 100 displays on the display device 102 that setting the information processing apparatus 100 as the management apparatus is rejected, to notify the user of it.

Thus, the setting module 241 sets the management apparatus based on a physical element, that is, whether or not the medium is placed on the medium tray 203. Thereby, the setting module 241 can appropriately change the management apparatus.

When the medium is not placed on the medium tray 203, the setting module 241 determines whether or not the unused time is more than a threshold, based on the use state acquired by the acquisition module 242 (step S107). The threshold is set to a sufficient time (e.g., 1 minute) for the user, for example, to set the medium on the medium tray 203. The threshold may also be set to any value by the user or a manager.

When the unused time is equal to or less than the threshold, the setting module 241 rejects setting the information processing apparatus 100 which is the transmission source of the setting request signal as the management apparatus (step S108), and returns the process to step S101. The setting module 241 transmits the setting reject signal to the information processing apparatus 100 which is the transmission source of the setting request signal via the second communication device 222.

Thus, the setting module 241 sets the management apparatus based on a time element, that is, a time in which the medium is not placed on the medium tray 203 in a state where any of the information processing apparatus 100 is set as the management apparatus. Thereby, the setting module 241 can appropriately change the management apparatus.

On the other hand, when the unused time is more than the threshold, the setting module 241 sets the information processing apparatus 100 which is the transmission source of the setting request signal as the management apparatus (step S109), and returns the process to step S101. The setting module 241 releases the information processing apparatus 100 currently set as the management apparatus from the management apparatus, and transmits a release notification signal to the information processing apparatus 100 released from the management apparatus, via the second communication device 222. The release notification signal is a signal for notifying that the information processing apparatus 100 is released from the management apparatus. When receiving the release notification signal, the information processing apparatus 100 displays on the display device 102 that the information processing apparatus 100 is released from the management apparatus, to notify the user of it. Next, the setting module 241 newly sets the information processing apparatus 100 which is the transmission source of the setting request signal as the management apparatus, and transmits the setting notification signal to the image reading apparatus 200 which is the transmission source of the setting request signal, via the second communication device 222.

Thus, the setting module 241 sets the management apparatus, that is, the information processing apparatus 100 capable of executing the imaging control of the imaging device 216 of the image reading apparatus 200, among the plurality of information processing apparatuses 100. Thereby, the setting module 241 can suppress the plurality of information processing apparatuses 100 from executing the imaging control of the image reading apparatus 200 in duplicate, and can suppress the input image generated according to an instruction from a specific information processing apparatus 100 from being erroneously transmitted to the other information processing apparatus 100.

In particular, the setting module 241 determines whether or not to set the other information processing apparatus 100 as the management apparatus based on the use state, when receiving the setting request signal from the other information processing apparatus 100, in a state where a specific information processing apparatus 100 is set as the management apparatus. The specific information processing apparatus 100 is an example of the first information processing apparatus. The other information processing apparatus 100 is an example of the second information processing apparatus. The setting module 241 determines whether or not the management apparatus should be changed based on the use state of the image reading apparatus 200. Thereby, the setting module 241 can appropriately change the information processing apparatus 100 capable of executing the imaging control.

Further, when the medium is not placed on the medium tray 203, the setting module 241 sets the other information processing apparatus 100 as the management apparatus. That is, the setting module 241 allows the other information processing apparatus 100 to use the image reading apparatus 200 that is not used by the management apparatus, while limiting that the other information processing apparatus use the image reading apparatus 200 used by the management apparatus. Thus, the setting module 241 allows the plurality of information processing apparatuses 100 to efficiently use the image reading apparatus 200 while suppressing the plurality of information processing apparatuses 100 from using the image reading apparatus 200 in duplicate.

Further, when the unused time is more than the threshold the setting module 241 sets the other information processing apparatus 100 as the management apparatus. That is, the setting module 241 allows the other information processing apparatus 100 to use the image reading apparatus 200 that is not used by the management apparatus while prohibiting the other information processing apparatus 100 from using the image reading apparatus 200 used by the management apparatus. In particular, the setting module 241 can suppress the image reading apparatus 200 from being used by the other information processing apparatus 100 from the time when the conveyance of the medium set on the medium tray 203 is completed until the time when the next medium is set. Thus, the setting module 241 can more reliably suppress the plurality of information processing apparatuses 100 from using the image reading apparatus 200 in duplicate.

On the other hand, when not receiving the setting request signal, the setting module 241 determines whether or not it has received a release request signal from the information processing apparatus 100 set as the management apparatus, via the second communication device 222 (step S110). The release request signal is a signal for requesting to release the information processing apparatus 100 from the management apparatus of the image reading apparatus 200. The first processing circuit 120 of the information processing apparatus 100 transmits the release request signal to the image reading apparatus 200 via the first communication device 103 when a release instruction of the imaging control of the imaging device 216 of the image reading apparatus 200 is input by the user using the operation device 101. For example, the first processing circuit 120 transmits the release request signal when the application software for controlling the image reading apparatus 200 is terminated. When not receiving the release request signal, the setting module 241 does not execute a particular process, and returns the process to step S101.

On the other hand, when receiving the release request signal, the setting module 241 releases the information processing apparatus 100 currently set as the management apparatus from the management apparatus (step S111), and returns the process to step S101. The setting module 241 transmits the release notification signal to the information processing apparatus 100 which is the transmission source of the release request signal, via the second communication device 222. Thus, the image reading apparatus 200 transitions to a state where none of the information processing apparatuses 100 is set as the management apparatus.

Any one of the processes in steps S105 to S106 and the processes in steps S107 to S108 may be omitted. When the processes in steps S105 to S106 are omitted, in step S104, the acquisition module 242 may not acquire whether or not the medium is placed on the medium tray 203, as the use state. Further, when the processes in steps S107 to S108 are omitted, in step S104, the acquisition module 242 may not acquire the unused time as the use state.

Figure 8:
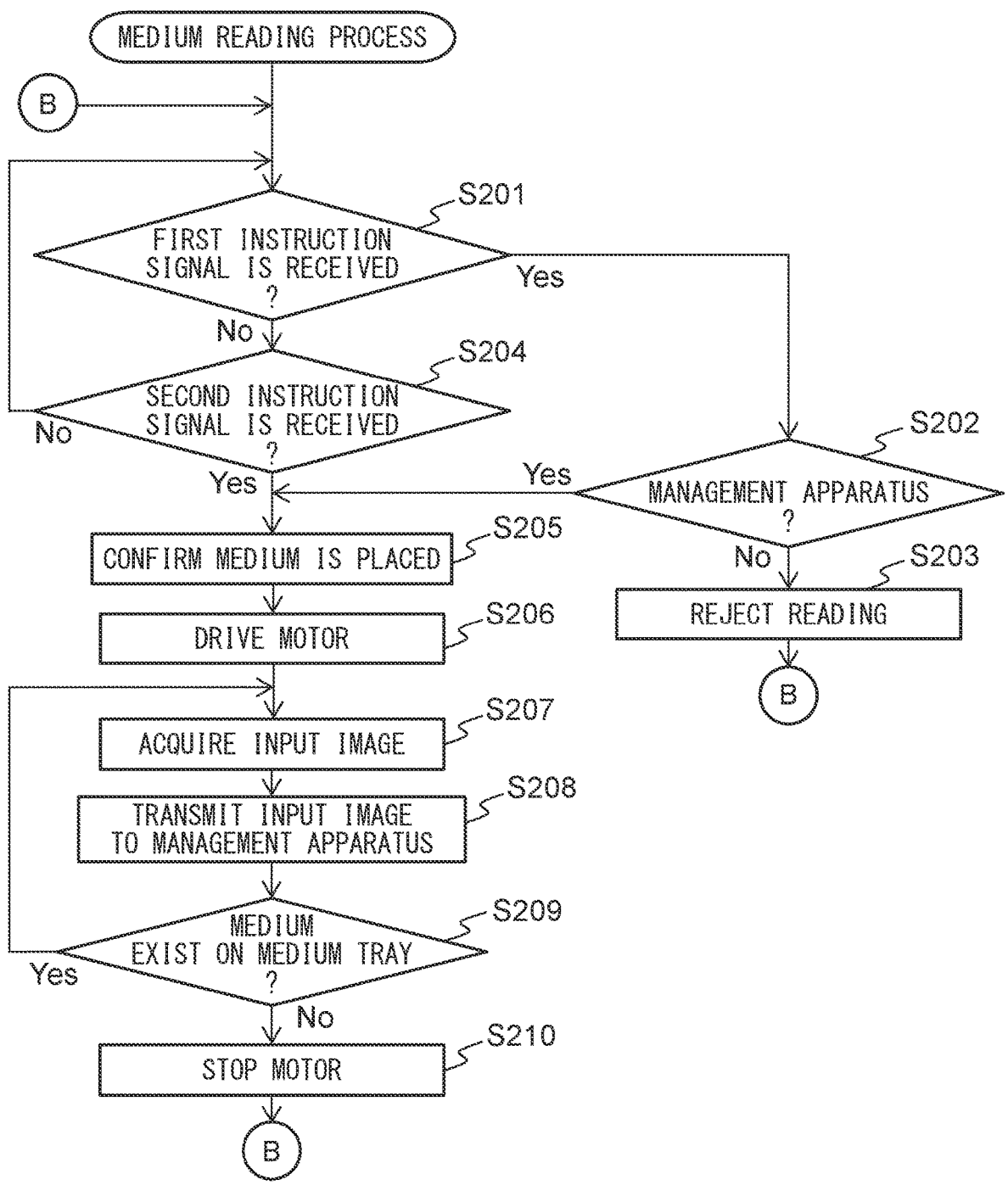
FIG. 8 is an operation sequence illustrating an operation example of a medium reading process.

FIG. 8 is a flowchart illustrating an operation example of a medium reading process of the image reading apparatus 200.

Referring to the flowchart illustrated in FIG. 8, the operation example of the medium reading process in the image reading apparatus 200 will be described below. The operation flow described below is executed mainly by the second processing circuit 240 in cooperation with each element in the image reading apparatus 200, in accordance with a program previously stored in the second storage device 230.

First, the control module 243 determines whether or not it has received a first instruction signal for instructing the reading of the medium from any of the information processing apparatuses 100, via the second communication device 222 (step S201). The first instruction signal is an example of an instruction signal. The first processing circuit 120 of the information processing apparatus 100 transmits the first instruction signal to the image reading apparatus 200 via the first communication device 103 when an instruction of the reading of the medium is input by the user using the operation device 101.

When receiving the first instruction signal, the control module 243 determines whether or not the information processing apparatus 100 which is the transmission source of the first instruction signal is the information processing apparatus 100 set as the management apparatus by the setting module 241 (step S202). When the information processing apparatus 100 which is the transmission source of the first instruction signal is the information processing apparatus 100 set as the management apparatus by the setting module 241, the control module 243 permits the reading of the medium, and shifts the process to step S205.

On the other hand, when the information processing apparatus 100 which is the transmission source of the first instruction signal is not the information processing apparatus 100 set as the management apparatus by the setting module 241, the control module 243 rejects the reading of the medium (step S203), and returns the process to step S201. The control module 243 transmits a read reject signal indicating that the reading of the medium is rejected to the information processing apparatus 100 which is the transmission source of the first instruction signal via the second communication device 222. When receiving the read reject signal, the information processing apparatus 100 displays on the display device 102 that the reading of the medium is rejected, to notify the user of it.

On the other hand, when not receiving the first instruction signal in step S201, the control module 243 determines whether or not it has received a second instruction signal instructing the reading of the medium from the display operating device 205 (step S204). The display operation device 205 transmits the second instruction signal to the second processing circuit 240 when an instruction of the reading of the medium is input by the user using the display operation device 205. When not receiving the second instruction signal, the control module 243 returns the process to step S201.

On the other hand, when receiving the first instruction signal from the information processing apparatus 100 set as the management apparatus, or when receiving the second instruction signal from the display operation device 205, the control module 243 waits until the medium is placed on the medium tray 203 (step S205). The control module 243 acquires the medium signal from the medium sensor 211, and determines whether or not the medium is placed on the medium tray 203, based on the acquired medium signal. When the medium is not placed on the medium tray 203, the control module 243 may display a notification for prompting the user to place the medium on the medium tray 203 on the display operation device 205 or the display device 102 of the information processing apparatus 100 which is the transmission source of the first instruction signal.

When the medium is placed on the medium tray 203, the control module 243 drives the motor 221. The control module 243 rotates the feed roller 212, the separation roller 213, the first conveyance roller 214, the first driven roller 215, the second conveyance roller 217 and/or the second driven roller 218 to convey the medium (step S206).

Next, the control module 243 causes the imaging device 216 to image the medium, and acquires the input image from the imaging device 216 (step S207). Thus, the control module 243 controls the imaging device 216 according to the first instruction signal from the information processing apparatus 100 set as the management apparatus by the setting module 241. Further, the control module 243 controls the imaging device 216 according to the second instruction signal from the display operation device 205.

Next, the control module 243 outputs the acquired input image by transmitting it to the information processing apparatus 100 set as the management apparatus, via the second communication device 222 (step S208).

Next, the control module 243 determines whether or not the medium remains on the medium tray 203 based on the medium signal received from the medium sensor 211 (step S209). When a medium remains on the medium tray 203, the control module 243 returns the process to step S207 and repeats the processes in steps S207 to S209.

On the other hand, when the medium does not remain on the medium tray 203, the control module 243 stops the motor 221 (step S210), and returns the process to step S201. Thus, the control module 243 stops the feed roller 212, the separation roller 213, the first conveyance roller 214, the first driven roller 215, the second conveyance roller 217 and/or the second driven roller 218.

As described in detail above, when the occupation is requested from the other information processing apparatus 100 in a state where it is occupied by a specific information processing apparatus 100, the image reading apparatus 200 determines whether or not to allow the occupation by the other information processing apparatus 100 based on the use state of itself. Thus, the image reading apparatus 200 can more appropriately manage the information processing apparatus 100 capable of executing the imaging control.

In particular, when the image reading apparatus 200 is not used by the information processing apparatus 100, although it is occupied by the specific information processing apparatus 100, it allows the use by the other information processing apparatus 100. Thereby, the image reading apparatus 200 can improve the availability. Further, when the image reading apparatus 200 is occupied by the specific information processing apparatus 100 and is used by the information processing apparatus 100, it restricts the use by the other information processing apparatus 100. Thereby, the image reading apparatus 200 can improve the confidentiality. That is, the image reading apparatus 200 can achieve both the availability and the confidentiality.

Further, in the image processing system 1, even when the user of the information processing apparatus 100 occupying the image reading apparatus 200 forgets to release the occupation of the image reading apparatus 200, the user of the other information processing apparatus 100 can use the image reading apparatus 200. Therefore, the image reading apparatus 200 can be efficiently used by a plurality of users.

Figure 9:
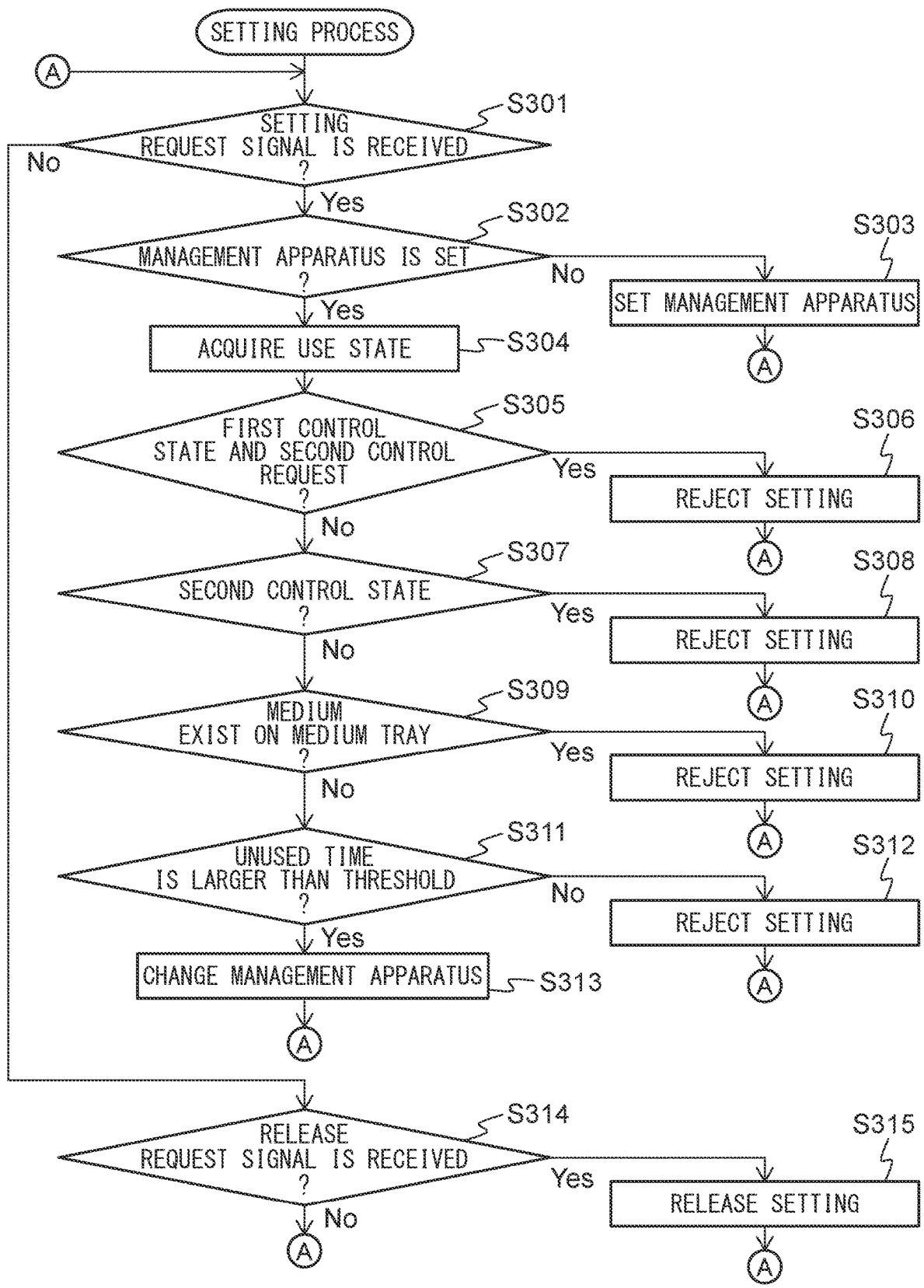
FIG. 9 is an operation sequence illustrating an operation example of anther setting process.

FIG. 9 is an operation sequence illustrating an operation example of the setting process performed by the image reading apparatus 200 according to another embodiment.

The flowchart shown in FIG. 9 is performed instead of the flowchart shown in FIG. 7. Since the processes in steps S309 to S315 of FIG. 9 are the same as the processes in steps S105 to S111 of FIG. 7, a description thereof will be omitted, and hereinafter, only the processes in step S301 to S308 will be described.

First, the setting module 241, similarly to the process in step S101, determines whether or not it has received the setting request signal from any of the information processing apparatuses 100 via the second communication device 222 (step S301). The setting request signal of the present embodiment includes any of a first control request for requesting the imaging control of the imaging device 216 according to the first instruction signal from the information processing apparatus 100, and a second control request for requesting the imaging control of the imaging device 216 according to the second instruction signal from the display operation device 205. The setting request signal including the first control request is an example of a request signal of the imaging control based on the first instruction signal. The setting request signal including the second control request is an example of a request signal of the imaging control based on the second instruction signal. The first processing circuit 120 of the information processing apparatus 100 transmits the setting request signal to the image reading apparatus 200 via the first communication device 103 according to a request specified by the user using the operation device 101. When not receiving the setting request signal, the setting module 241 proceeds the process to step S314.

On the other hand, when receiving the setting request signal, the setting module 241 determines whether or not the information processing apparatus 100 has already been set as the management apparatus (step S302).

When any of the information processing apparatuses 100 has not yet been set as the management apparatus, similarly to the process in step S103, the setting module 241 sets the information processing apparatus 100 which is the transmission source of the setting request signal as the management apparatus (step S303), and returns the process to step S301. The setting module 241 further sets whether to allow the imaging control of the imaging device 216 according to the first instruction signal from the information processing apparatus 100 or to allow the imaging control of the imaging device 216 according to the second instruction signal from the display operation device 205, according to the control request included in the setting request signal. Hereinafter, the state where the imaging control of the imaging device 216 according to the first instruction signal from the information processing apparatus 100 is allowed may be referred to as a first control state, and the state where the imaging control of the imaging device 216 according to the second instruction signal from the display operation device 205 may be referred to as a second control state.

Incidentally, when receiving the first instruction signal in step S201 of FIG. 8 in the first control state, the control module 243 controls the imaging device 216 by executing the process in step S205 and the subsequent processes, on the condition that the information processing apparatus 100 which is the transmission source of the first instruction signal is set as the management apparatus. On the other hand, when receiving the second instruction signal in step S204 of FIG. 8 in the first control state, the control module 243 rejects the reading of the medium, and displays on the display operating device 205 that the reading of the medium is rejected, to notify the user of it. That is, in the first control state, the control module 243 controls the imaging device 216 according to the first instruction signal.

Further, when receiving the first instruction signal in step S201 of FIG. 8 in the second control state, the control module 243 rejects the reading of the medium, and transmits the read reject signal to the information processing apparatus 100 which is the transmission source of the first instruction signal via the second communication device 222. On the other hand, when receiving the second instruction signal in step S204 of FIG. 8 in the second control state, the control module 243 controls the imaging device 216 by executing the process in step S205 and the subsequent processes. That is, in the second control state, the control module 243 controls the imaging device 216 according to the second instruction signal.

On the other hand, when the specific information processing apparatus 100 has already been set as the management apparatus, the acquisition module 242 acquires the use state of the image reading apparatus 200 (step S304). The acquisition module 242 acquires the control state of the image reading apparatus 200 in addition to whether or not the medium is placed on the medium tray 203 and/or the unused time, as the use state. The acquisition module 242 specifies whether the control state of the image reading apparatus 200 is the first control state, the second control state, or neither the first control state nor the second control state. That is, the acquisition module 242 identifies whether the control module 243 controls the imaging device 216 according to the first instruction signal, controls the imaging device 216 according to the second instruction signal, or does not control the imaging device 216 according to each instruction signal, as the use state.

Next, the setting module 241 determines whether or not the image reading apparatus 200 is in the first control state based on the use state acquired by the acquisition module 242, and determines whether or not the control request included in the setting request signal is the second control request (step S305).

When the image reading apparatus 200 is in the first control state and the control request is the second control request, the setting module 241 rejects setting the information processing apparatus 100 which is the transmission source of the setting request signal as the management apparatus (step S306), and returns the process to step S101. The setting module 241 transmits the setting reject signal to the information processing apparatus 100 which is the transmission source of the setting request signal via the second communication device 222. Even when the image reading apparatus 200 is in the second control state and the control request is the second control request, the setting module 241 may reject setting the information processing apparatus 100 which is the transmission source of the setting request signal as the management apparatus.

That is, when receiving the setting request signal including the second control request from the other information processing apparatus 100 in a state where the specific information processing apparatus 100 is set as the management apparatus, the setting module 241 does not set the other information processing apparatus 100 as the management apparatus. Thus, the setting module 241 can prevent the user of the other information processing apparatus 100 from using the image reading apparatus 200 by using the display operation device 205 while the image reading apparatus 200 is used by the specific information processing apparatus 100. In particular, the setting module 241 can prevent the user of the other information processing apparatus 100 from using the image reading apparatus 200 by using the display operation apparatus 205 while the image reading apparatus 200 is used by the user of the specific information processing apparatus 100 at a position away from the image reading apparatus 200. Therefore, the image reading apparatus 200 can prevent the input image generated according to the operation of the display operation device 205 by the user from being erroneously transmitted to the information processing apparatus 100 used by another user.

On the other hand, when the image reading apparatus 200 is not in the first control state or the control request is not in the second control request, the setting module 241 determines whether or not the image reading apparatus 200 is in the second control state based on the use state acquired by the acquisition module 242 (step S307).

When the image reading apparatus 200 is in the second control state, the setting module 241 rejects setting the information processing apparatus 100 which is the transmission source of the setting request signal as the management apparatus (step S308), and returns the process to step S101. The setting module 241 transmits the setting reject signal to the information processing apparatus 100 which is the transmission source of the setting request signal via the second communication device 222.

Thus, the setting module 241 sets the management apparatus based on a logical element, that is, how the image reading apparatus 200 is controlled by the information processing apparatus 100. Thereby, the setting module 241 can appropriately change the management apparatus.

As described above, for example, the information processing apparatus 100 transmits the setting request signal when the application software for controlling the image reading apparatus 200 is started, and transmits the release request signal when the software is terminated. When the imaging control of the imaging device 216 according to the first instruction signal from the information processing apparatus 100 is executed, usually, the user starts the software when using the image reading apparatus 200 and terminates the software after the end of use. Therefore, when the image reading apparatus 200 is not used even when it is occupied by the specific information processing apparatus 100, the user is likely to forget to terminate the software after the use of the image reading apparatus 200 is completed.

On the other hand, when the imaging control of the imaging device 216 according to the second instruction signal from the display operation device 205 is executed, the software is used in a state permanently stationed in the information processing apparatus 100, so as to monitor that the display operation device 205 is operated. Therefore, when the image reading apparatus 200 is occupied by a specific information processing apparatus 100, the image reading apparatus 200 is likely to be used at an arbitrary timing even when it is not currently in use.

As described above, when the control module 243 controls the imaging device 216 according to the second instruction signal, the setting module 241 does not set the other information processing apparatus 100 as the management apparatus. That is, the setting module 241 does not set the other information processing apparatus 100 as the management apparatus when the image reading apparatus 200 is controlled by using the display operation device 205. Thus, the setting module 241 can more reliably suppress the image reading apparatus 200 controlled by using the display operation device 205, from being used by the other information processing apparatus 100.

Note that at least one of the processes in steps S305 to S306, the processes in steps S307 to S308, the processes in steps S309 to S310, and the processes in steps S311 to S312 may be executed, and the other processes may be omitted. When the processes in steps S305 to S306 and the processes in steps S307 to S308 are omitted, in step S304, the acquisition module 242 may not acquire the control state of the image reading apparatus 200, as the use state. When the processes in steps S309 to S310 are omitted, in step S304, the acquisition module 242 may not acquire whether or not the medium is placed on the medium tray 203, as the use state. Further, when the processes in steps S311 to S312 are omitted, in step S304, the acquisition module 242 may not acquire the unused time as the use state.

As described in detail above, the image reading apparatus 200 can more appropriately manage the information processing apparatus 100 capable of executing the imaging control even when the apparatus used for the instruction of the imaging control is specified to either of the information processing apparatus 100 and the image reading apparatus 200.

Figure 10:
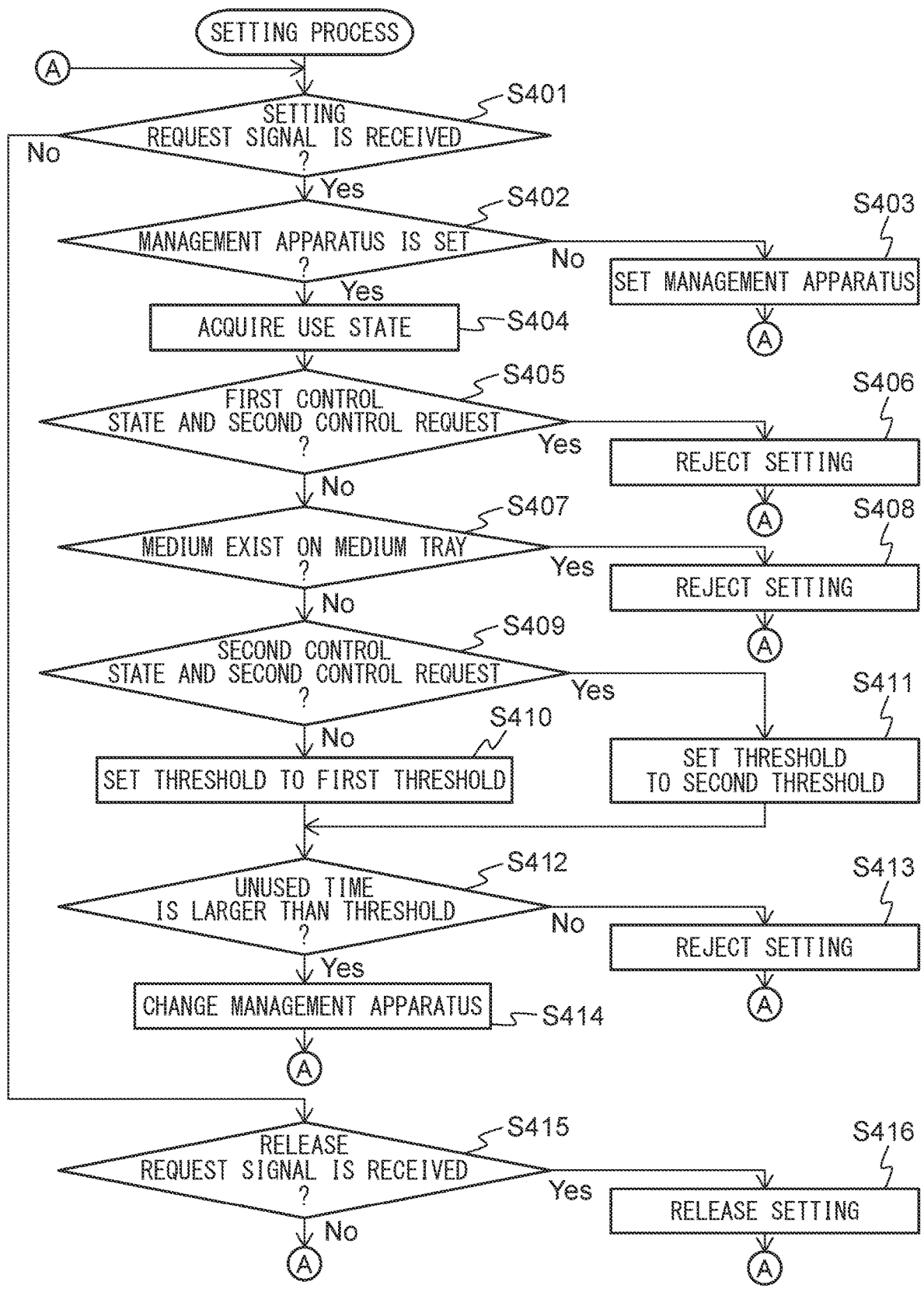
FIG. 10 is an operation sequence illustrating an operation example of anther setting process.

FIG. 10 is an operation sequence illustrating an operation example of the setting process performed by the image reading apparatus 200 according to still another embodiment.

The flowchart shown in FIG. 10 is executed instead of the flowchart shown in FIG. 9. Since the processes in steps S401 to S406, S407 to S408, S415 to S416 of FIG. 10 are the same as the processes in steps S301 to S306, S309 to S310, S314 to S315 of FIG. 9, a description thereof will be omitted. Hereinafter, only the processes in steps S409 to S414 will be described.

In step S409, the setting module 241 determines whether or not the image reading apparatus 200 is in the second control state based on the use state acquired by the acquisition module 242, and determines whether or not the control request included in the setting request signal is the second control request (step S409).

When the image reading apparatus 200 is not in the second control state, that is, when the image reading apparatus 200 is in the first control state, or when the control request is not the second control request, the setting module 241 sets the threshold for comparing with the unused time to a first threshold (step S410). The first threshold is set to a sufficient time (e.g., 1 minute) for the user to set the medium on the medium tray 203. The first threshold may be set to an arbitrary value by the user or the manager.

On the other hand, when the image reading apparatus 200 is in the second control state and the control request is the second control request, the setting module 241 sets the threshold for comparing with the unused time to a second threshold (step S411). The second threshold is set to a value more than the first threshold (e.g., 3 minutes). The second threshold may also be set to an arbitrary value by the user or the manager. The setting module 241 may set the threshold to the second threshold even when the image reading apparatus 200 is in the second control state and the control request is the first control request.

Next, the setting module 241 determines whether or not the unused time is more than the threshold set in step S410 or S411 (step S412).

When the unused time is equal to or less than the threshold, the setting module 241 rejects setting the information processing apparatus 100 which is the transmission source of the setting request signal as the management apparatus (step S413), and returns the process to step S401. The setting module 241 transmits the setting reject signal to the information processing apparatus 100 which is the transmission source of the setting request signal via the second communication device 222.

On the other hand, when the unused time is larger than the threshold, the setting module 241 sets the information processing apparatus 100 which is the transmission source of the setting request signal as the management apparatus (step S414), and returns the process to step S401. The setting module 241 releases the information processing apparatus 100 currently set as the management apparatus from the management apparatus, and transmits the release notification signal to the information processing apparatus 100 released from the management apparatus, via the second communication device 222. Next, the setting module 241 newly sets the information processing apparatus 100 which is the transmission source of the setting request signal as the management apparatus, and transmits the setting notification signal to the image reading apparatus 200 which is the transmission source of the setting request signal, via the second communication device 222.

Thus, the setting module 241 sets the management apparatus based on a logical element, that is, how the image reading apparatus 200 is controlled by the information processing apparatus 100. Thereby, the setting module 241 can appropriately change the management apparatus.

As described above, when the image reading apparatus 200 set so that the imaging control according to the first instruction signal from the information processing apparatus 100 is executed is not used, the user is likely to forget to terminate the software after the use of the image reading apparatus 200 is completed. On the other hand, when the image reading apparatus 200 set so that the imaging control according to the second instruction signal from the display operation device 205 is executed is not used, the image reading apparatus 200 is likely to be used at an arbitrary timing.

The setting module 241 sets a value more than the threshold when the control module 243 does not control the imaging device 216 according to the second instruction signal, as the threshold when the control module 243 controls the imaging device 216 according to the second instruction signal. That is, when the image reading apparatus 200 is controlled by using the display operation device 205, the setting module 241 makes it difficult to set the other information processing apparatus 100 as the management apparatus. Thus, the setting module 241 can suppress the information processing apparatus 100 occupying the image reading apparatus 200 set to be controlled by using the display operation device 205 from being changed frequently. Therefore, the user of the information processing apparatus 100 occupying the image reading apparatus 200 can stably use the image reading apparatus 200.

The processes in steps S405 to S406 and the processes in steps S407 to S408 may be omitted. When the processes in steps S407 to S408 are omitted, in step S404, the acquisition module 242 may not acquire whether or not the medium is placed on the medium tray 203, as the use state.

As described in detail above, the image reading apparatus 200 can more appropriately manage the information processing apparatus 100 capable of executing the imaging control even when the threshold for comparing with the unused time is dynamically changed.

Figure 11:
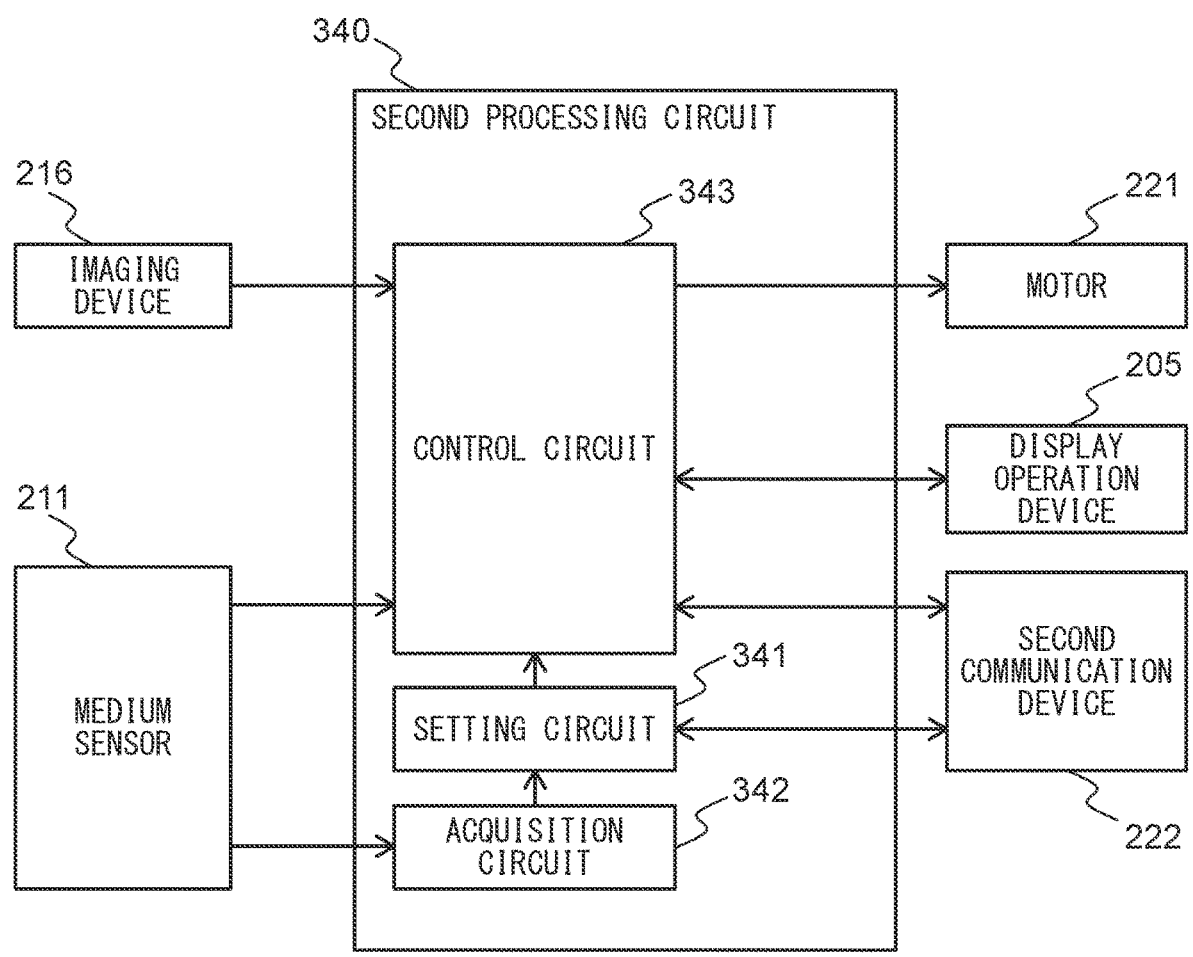
FIG. 11 is a diagram illustrating a schematic configuration of another second processing circuit 340, etc.

FIG. 11 is a diagram illustrating a schematic configuration of a second processing circuit 340 in an image reading apparatus according to another embodiment. The second processing circuit 340 is used in place of the second processing circuit 240 of the image reading apparatus 200, and executes the setting process, the image reading process, etc., instead of the second processing circuit 240. The second processing circuit 340 includes a setting circuit 341, the acquisition circuit 342 and the control circuit 343, etc. Note that each unit may be configured by an independent integrated circuit, a microprocessor, firmware, etc.

The setting circuit 341 is an example of a setting module, and has a function similar to the setting module 241. The setting circuit 341 receives the setting request signal from the information processing apparatus 100 via the second communication device 222, receives the use state of the image reading apparatus from the acquisition circuit 342, sets the management apparatus based on the received use state, and outputs the setting result to the control circuit 343.

The acquisition circuit 342 is an example of the acquisition module and has a function similar to the acquisition module 242. The acquisition circuit 342 receives the medium signal from the medium sensor 211, acquires the use state of the image reading apparatus based on the received medium signal, etc., and outputs it to the setting circuit 341.

The control circuit 343 is an example of a control module and has a function similar to the control module 243. The control circuit 343 receives each instruction signal from the display operation device 205 or the second communication device 222, the medium signal from the medium sensor 211, the setting result of the management apparatus from the setting circuit 341, controls the motor 221 based on the received information, and receives the input image from the imaging device 216. The control circuit 343 outputs the input image to the information processing apparatus 100 via the second communication device 222.

As described in detail above, even when the second processing circuit 340 is used, the image reading apparatus can more appropriately manage the information processing apparatus 100 capable of executing the imaging control.

The image reading apparatus, the method for controlling the image reading apparatus, and the computer-readable, non-transitory medium storing the computer program according to the embodiment can more appropriately manage the information processing apparatus capable of executing the imaging control.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image reading apparatus comprising:
    an imaging device to image a medium;
    a communication device to communicate with a plurality of information processing apparatuses; and
    a processor to
        acquire a use state of the image reading apparatus,
        set a first information processing apparatus as an information processing apparatus capable of executing imaging control of the imaging device when receiving a setting request signal from the first information processing apparatus,
        control the imaging device according to an instruction signal from the first information processing apparatus in a state where the first information processing apparatus is set as the information processing apparatus capable of executing the imaging control,
        wherein the processor does not release the first information processing apparatus from being set as the information processing apparatus capable of executing imaging control of the imaging device, when imaging by the imaging device has been completed, and
        release the first information processing apparatus from being set as the information processing apparatus capable of executing imaging control of the imaging device, when receiving a release request signal from the first information processing apparatus, wherein
        the processor sets a second information processing apparatus as the information processing apparatus capable of executing the imaging control, based on the use state, when receiving a request signal of the imaging control from the second information processing apparatus in a state where the first information processing apparatus is set as the information processing apparatus capable of executing the imaging control, even when the first information processing apparatus is not released from being set as the information processing apparatus capable of executing imaging control of the imaging device.

2. The image reading apparatus according to claim 1, further comprising a medium tray to place the medium, wherein
    the processor acquires whether the medium is placed on the medium tray, as the use state, and wherein
    the processor sets the second information processing apparatus as the information processing apparatus capable of executing the imaging control when the medium is not placed on the medium tray.

3. The image reading apparatus according to claim 1, further comprising an operation device to receive an operation by a user, wherein
    the processor further controls the imaging device according to a second instruction signal from the operating device, wherein
    the processor acquires whether the processor controls the imaging device according to the second instruction signal, as the use state, and wherein
    the processor does not set the second information processing apparatus as the information processing apparatus capable of executing the imaging control when the processor controls the imaging device according to the second instruction signal.

4. The image reading apparatus according to claim 1, further comprising an operation device to receive an operation by a user, wherein
    the processor further controls the imaging device according to a second instruction signal from the operating device, and wherein the processor does not set the second information processing apparatus as the information processing apparatus capable of executing the imaging control when receiving the request signal of the imaging control based on the second instruction signal from the second information processing apparatus in a state where the first information processing apparatus is set as the information processing apparatus capable of executing the imaging control.

5. An image reading apparatus comprising:
an imaging device to image a medium;
a communication device to communicate with a plurality of information processing apparatuses;
a processor to
  acquire a use state of the image reading apparatus,
  set a first information processing apparatus as an information processing apparatus capable of executing imaging control of the imaging device when receiving a setting request signal from the first information processing apparatus,
  control the imaging device according to an instruction signal from the first information processing apparatus in a state where the first information processing apparatus is set as the information processing apparatus capable of executing the imaging control, wherein the processor does not release the first information processing apparatus set as the information processing apparatus capable of executing imaging control of the imaging device, when imaging by the imaging device has been completed, and
  release the first information processing apparatus set as the information processing apparatus capable of executing imaging control of the imaging device, when receiving a release request signal from the first information processing apparatus, wherein
the processor determines whether to set a second information processing apparatus as the information processing apparatus capable of executing the imaging control, based on the use state, when receiving a request signal of the imaging control from the second information processing apparatus in a state where the first information processing apparatus is set as the information processing apparatus capable of executing the imaging control; and a medium tray to place the medium, wherein
the processor acquires a time in which the medium is not placed on the medium tray while the first information processing apparatus is set as the information processing apparatus capable of executing the imaging control by the processor, as the use state, and wherein
the processor sets the second information processing apparatus as the information processing apparatus capable of executing the imaging control when the time is more than a threshold.

6. The image reading apparatus according to claim 5, further comprising an operation device to receive an operation by a user, wherein
the processor further controls the imaging device according to a second instruction signal from the operating device, wherein
the processor acquires whether the processor controls the imaging device according to the second instruction signal, as the use state, and wherein
the processor sets a value more than the threshold when the processor does not control the imaging device according to the second instruction signal, as the threshold when the processor controls the imaging device according to the second instruction signal.

7. A method for controlling an image reading apparatus including a communication device to communicate with a plurality of information processing apparatuses, comprising:
imaging a medium, by an imaging device;
acquiring a use state of the image reading apparatus;
setting a first information processing apparatus as an information processing apparatus capable of executing imaging control of the imaging device when receiving a setting request signal from the first information processing apparatus;
controlling the imaging device according to an instruction signal from the first information processing apparatus in a state where the first information processing apparatus is set as the information processing apparatus capable of executing the imaging control, wherein the first information processing apparatus is not released from the information processing apparatus capable of executing imaging control of the imaging device when imaging by the imaging device has been completed, and
releasing the first information processing apparatus from being set as the information processing apparatus capable of executing imaging control of the imaging device, when receiving a release request signal from the first information processing apparatus, wherein
setting a second information processing apparatus as the information processing apparatus capable of executing the imaging control, is determined based on the use state, when receiving a request signal of the imaging control from the second information processing apparatus in a state where the first information processing apparatus is set as the information processing apparatus capable of executing the imaging control, even when the first information processing apparatus is not released from being set as the information processing apparatus capable of executing imaging control of the imaging device.

8. The method according to claim 7, wherein
the image reading apparatus further includes a medium tray to place the medium, wherein
whether the medium is placed on the medium tray, is acquired as the use state, and wherein
the second information processing apparatus is set as the information processing apparatus capable of executing the imaging control when the medium is not placed on the medium tray.

9. The method according to claim 7, wherein
the image reading apparatus further includes a medium tray to place the medium, wherein
a time in which the medium is not placed on the medium tray while the first information processing apparatus is set as the information processing apparatus capable of executing the imaging control, is acquired as the use state, and wherein
the second information processing apparatus is set as the information processing apparatus capable of executing the imaging control when the time is more than a threshold.

10. The method according to claim 9, wherein
the image reading apparatus further includes an operation device to receive an operation by a user, wherein
the imaging device is controlled according to a second instruction signal from the operating device, wherein whether the imaging device is controlled according to the second instruction signal, is acquired as the use state, and wherein a value more than the threshold when the imaging device is not controlled according to the second instruction signal, is set as the threshold when the imaging device is controlled according to the second instruction signal.

11. The method according to claim 7, wherein
the image reading apparatus further includes an operation device to receive an operation by a user, wherein
the imaging device is controlled according to a second instruction signal from the operating device, wherein
whether the imaging device is controlled according to the second instruction signal, is acquired as the use state, and wherein
the second information processing apparatus is not set as the information processing apparatus capable of executing the imaging control when the imaging device is controlled according to the second instruction signal.

12. The method according to claim 7, wherein
the image reading apparatus further includes an operation device to receive an operation by a user, wherein
the imaging device is controlled according to a second instruction signal from the operating device, and wherein
the second information processing apparatus is not set as the information processing apparatus capable of executing the imaging control when receiving the request signal of the imaging control based on the second instruction signal from the second information processing apparatus in a state where the first information processing apparatus is set as the information processing apparatus capable of executing the imaging control.

13. A computer-readable, non-transitory medium storing a computer program, wherein the computer program causes an image reading apparatus including an imaging device to image a medium, and a communication device to communicate with a plurality of information processing apparatuses, to execute a process, the process comprising:
acquiring a use state of the image reading apparatus;
setting a first information processing apparatus as an information processing apparatus capable of executing imaging control of the imaging device when receiving a setting request signal from the first information processing apparatus;
controlling the imaging device according to an instruction signal from the first information processing apparatus in a state where the first information processing apparatus is set as the information processing apparatus capable of executing the imaging control, wherein the first information processing apparatus is not released from the information processing apparatus capable of executing imaging control of the imaging device when imaging by the imaging device has been completed, and
releasing the first information processing apparatus from being set as the information processing apparatus capable of executing imaging control of the imaging device, when receiving a release request signal from the first information processing apparatus, wherein
setting a second information processing apparatus as the information processing apparatus capable of executing the imaging control, is determined based on the use state, when receiving a request signal of the imaging control from the second information processing apparatus in a state where the first information processing apparatus is set as the information processing apparatus capable of executing the imaging control, even when the first information processing apparatus is not released from being set as the information processing apparatus capable of executing imaging control of the imaging device.

14. The computer-readable, non-transitory medium according to claim 13, wherein
the image reading apparatus further includes a medium tray to place the medium, wherein
whether the medium is placed on the medium tray, is acquired as the use state, and wherein
the second information processing apparatus is set as the information processing apparatus capable of executing the imaging control when the medium is not placed on the medium tray.

15. The computer-readable, non-transitory medium according to claim 13, wherein
the image reading apparatus further includes a medium tray to place the medium, wherein
a time in which the medium is not placed on the medium tray while the first information processing apparatus is set as the information processing apparatus capable of executing the imaging control, is acquired as the use state, and wherein
the second information processing apparatus is set as the information processing apparatus capable of executing the imaging control when the time is more than a threshold.

16. The computer-readable, non-transitory medium according to claim 15, wherein
the image reading apparatus further includes an operation device to receive an operation by a user, wherein
the imaging device is controlled according to a second instruction signal from the operating device, wherein
whether the imaging device is controlled according to the second instruction signal, is acquired as the use state, and wherein
a value more than the threshold when the imaging device is not controlled according to the second instruction signal, is set as the threshold when the imaging device is controlled according to the second instruction signal.

17. The computer-readable, non-transitory medium according to claim 13, wherein
the image reading apparatus further includes an operation device to receive an operation by a user, wherein
the imaging device is controlled according to a second instruction signal from the operating device, wherein
whether the imaging device is controlled according to the second instruction signal, is acquired as the use state, and wherein
the second information processing apparatus is not set as the information processing apparatus capable of executing the imaging control when the imaging device is controlled according to the second instruction signal.

18. The computer-readable, non-transitory medium according to claim 13, wherein
the image reading apparatus further includes an operation device to receive an operation by a user, wherein
the imaging device is controlled according to a second instruction signal from the operating device, and wherein
the second information processing apparatus is not set as the information processing apparatus capable of executing the imaging control when receiving the request signal of the imaging control based on the second instruction signal from the second information processing apparatus in a state where the first information processing apparatus is set as the information processing apparatus capable of executing the imaging control.

\* \* \* \* \*